United States Patent Office 3,027,931
Patented Apr. 3, 1962

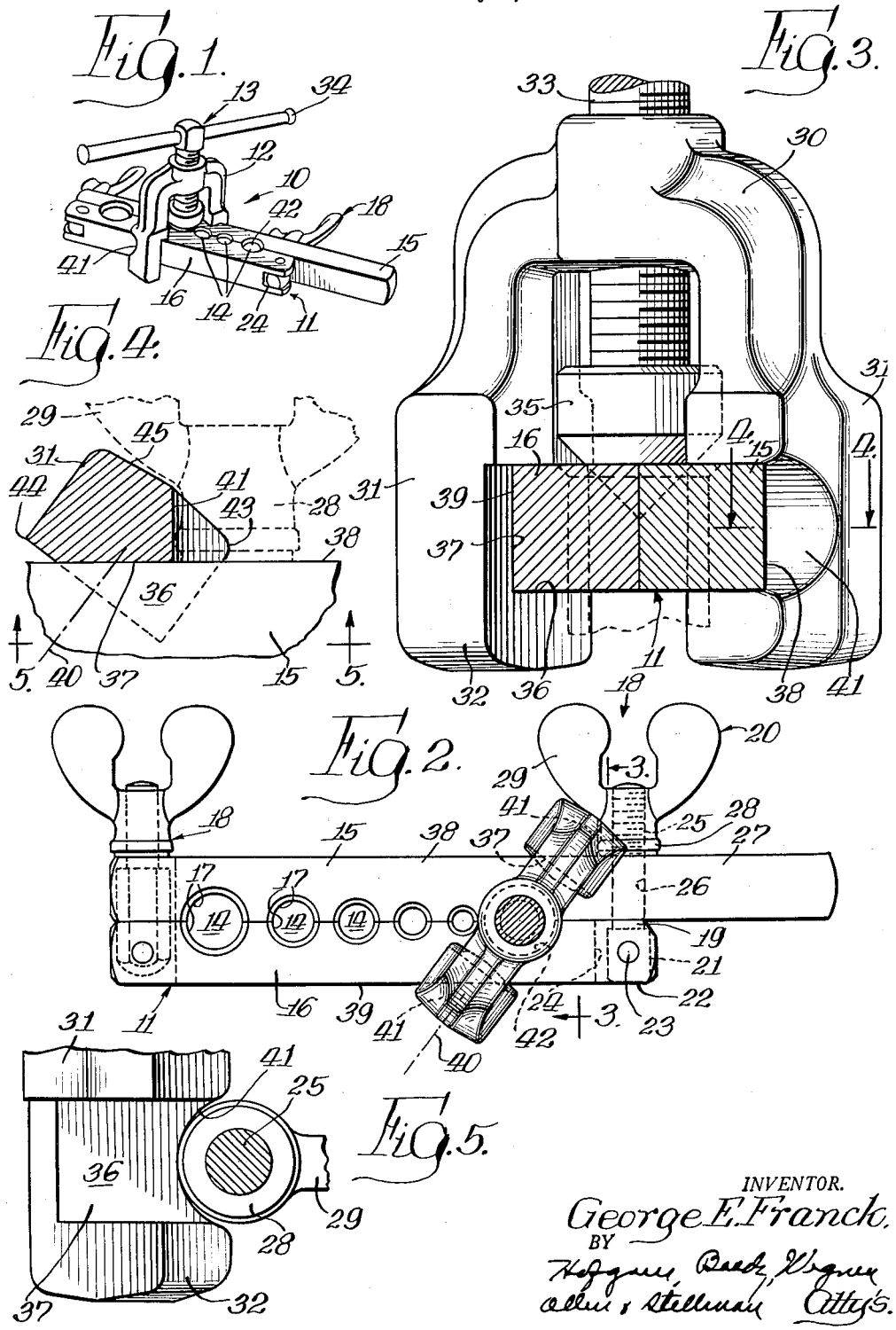

3,027,931
FLARING TOOL
George E. Franck, Riverside, Ill., assignor to Imperial-Eastman Corporation, a corporation of Illinois
Filed July 1, 1959, Ser. No. 824,320
5 Claims. (Cl. 153—79)

This invention relates to flaring tools, and in particular to tube flaring tools provided with slip-on yokes.

A well-known form of flaring tool includes a clamping bar assembly having a pair of elongated bars provided with confronting semicylindrical recesses defining, when the bars are juxtaposed, a series of axially parallel, cylindrical tube clamping recesses. Clamping means are associated with the bars and include a clamping bolt pivotally secured to one end of one of the bars and extendible through and beyond the adjacent end of the other of the elongated bars. A clamping nut is threaded to the bolt end to abut said adjacent end of the other bar and, when suitably advanced, forcibly juxtapose the bars.

A principal object of the instant invention is to provide a new and improved yoke for use in such a tube flaring device which eliminates undesirable interference between the yoke and the clamping means.

Another object is to provide such a yoke comprising a crosspiece and a pair of legs depending from the crosspiece and spaced apart at their distal ends a distance substantially equal to the width of the juxtaposed bars for sliding movement over the bars parallel to the axes of the clamping recesses in the bars, and reversely similar compound recesses in the respective legs, each of said recesses being spaced inwardly from the distal end of the leg and defined by an inner planar surface extending in a plane parallel to the outer surfaces of the bars when the yoke is in tube flaring operative position on the bars, the planar surface further extending at an acute angle to the central plane of the yoke, and an outer, segmentally cylindrical surface extending outwardly from and axially perpendicular to the planar surface to receive a portion of the clamping means when the yoke straddles the juxtaposed bars with the planar surfaces abutting the outer surfaces of the bars.

A further object is to provide such a yoke which is provided with legs having a generally quadrate cross section in a plane perpendicular to the longitudinal extent thereof and wherein the planar surface of each leg is aligned with the plane defined by opposed corner edges thereof.

Still another object of the invention is to provide such a yoke wherein the cylindrical surface portion of the compound recess extends to the central plane of the yoke.

Other features and advantages of the invention will be apparent from the following description, taken in connection with the accompanying drawing wherein:

FIG. 1 is a perspective view of a flaring tool provided with a yoke embodying the invention;

FIG. 2 is an enlarged plan thereof, with the flaring cone rod shown in section;

FIG. 3 is an enlarged transverse section taken substantially along the line 3—3 of FIG. 2;

FIG. 4 is a fragmentary section taken substantially along the line 4—4 of FIG. 3, and with a portion of the wing nut shown in broken lines; and FIG. 5 is a fragmentary section taken substantially along the line 5—5 of FIG. 4, but with the clamping bar removed.

In the exemplary embodiment of the invention as shown in the drawing, a tube flaring device generally designated 10 includes a clamping bar assembly generally designated 11, a yoke 12 slidably mounted on the clamping bar assembly, and a flaring means generally designated 13 carried by the yoke 12 for flaring a tube end (not shown) clamping in any one of a plurality of tube clamping recesses 14 formed by the clamping bar assembly 11. Yoke 12 is of the slip-on type permitting it to be installed and removed relative to clamping bar assembly 11 by movement of the yoke thereover parallel to the axes of the recesses 14. In tube flaring disposition, the yoke 12 is turned on the clamping bar assembly to have its central plane 40 extend at an acute angle to the longitudinal extent of the clamping bar assembly. The instant invention comprehends a yoke construction permitting proper coaxial relationship of the tube flaring means 13 carried by the yoke and the axis of each of the recesses 14 while effectively minimizing the over-all length of the clamping bar assembly 11.

More specifically, clamping bar assembly 11 comprises a pair of elongated clamping bars 15 and 16 each of which is provided with a plurality of confronting semicylindrical recesses 17 co-operatively defining a series of different diameter tube clamping recesses 14. Means for forcibly clamping a tube end (not shown) in a corresponding recess 14 comprises a pair of clamping means generally designated 18. The clamping means are generally similar, each comprising a clamping bolt 19 and a clamping nut 20, which may be in the form of a wing nut for facilitated manipulation. One end 21 of bolt 19 is pivotally secured to an end 22 of bar 16 by a pin 23 extending transversely through a recess 24 in the end 22. The other end 25 of the clamping bolt is threaded and extends through and outwardly from an opening 26 in the adjacent end portion 27 of the other bar 15.

Clamping nut 20 includes a generally cylindrical base portion 28 threaded to clamping bolt end 25, and laterally extending wing portions 29 adapted to be engaged by the user's fingers to manipulate the clamping nut.

Yoke 12 comprises a crosspiece portion 30 and a pair of legs 31 depending from crosspiece 30 and spaced apart at their distal ends 32 a distance substantially equal to the width of the juxtaposed bars 15 and 16 to have sliding movement over the bars parallel to the axes of the clamping recesses 14 when the yoke is arranged with its central plane perpendicular to the longitudinal extent of the clamping bars. Tube flaring means 13 includes a rod portion 33 threaded through crosspiece 30 of yoke 12 for movement coaxially of a selected recess 14 over which the yoke is centered. At its outer end, the rod 33 is provided with a laterally extending handle 34 and at its inner end the rod is provided with a flaring cone 35 of conventional construction.

As indicated briefly above, in its operative position on bars 15 and 16, the yoke 12 is turned to have its central plane 40 extend at an acute angle to the longitudinal extent of the bar (as best seen in FIGS. 1 and 2). To permit this arrangement of the yoke, each of legs 31 is provided with a recess 36 spaced from the distal end 32 thereof and slidably receiving the clamping bar assembly 11. Recesses 36 are reversely similar, each comprising a compound recess defined by an inner planar surface 37 extending in a plane parallel to the confronting clamping bar outer surface, i.e., outer surface 38 of clamping bar 15, and outer surface 39 of clamping bar 16. As best seen in FIGS. 2 and 4, the plane of planar surface 37 extends at an acute angle to central plane 40 of the yoke, so that when leg surfaces 37 abut bar surfaces 38 and 39, the central plane 40 of the yoke extends angularly to the longitudinal angle of the clamping bar assembly 11 and the clamping means 11 is retained slidably in recesses 36.

Each recess 36 is further defined by an outer segmentally cylindrical surface 41 extending outwardly from and axially perpendicular to planar surface 37 to accommodate a portion of the base 28 of clamping nut 18 when yoke 12 straddles the clamping bar assembly 11 with flaring means 13 arranged coaxially of the clamping recess 42 closest to end portion 27 of bar 15 and end 22 of bar 16.

More specifically, as best seen in FIG. 4, the cross section of legs 31 is generally quadrate in a plane perpendicular to the longitudinal extent thereof, and planar surface 37 extends generally parallel to the plane defined by the diagonally opposite corner edges 43 and 44 thereof and, thusly, at an angle of substantially 45° to the central plane of the yoke. Cylindrical surface 41 opens through the outer surface 45 of the leg substantially from the central plane 40 to define a concave recess portion having an extent in the longitudinal direction of the leg substantially equal to the extent of planar surface 37 in the longitudinal direction of the leg, and adapted to accommodate substantially one-half of the clamping nut base portion 28. As seen in FIG. 2, outer surface 45 of leg 31 clears wing portion 29 of the clamping nut at all times.

In utilizing flaring device 10, wing nuts 20 are retrogradely threaded to release the clamped association of the bars 15 and 16. The tube end (not shown) is then inserted through the selected one of the clamping recesses 14 and the clamping nuts are then advanced on the clamping bolts to juxtapose forcibly the clamping bars and thereby grip the tube end in the clamping recess. Yoke 12 is installed on the clamping bar assembly by sliding the legs 31 over the bar surfaces 38 and 39 parallel to the axes of the clamping recess. The yoke is then turned to abut planar surfaces 37 with bar surfaces 38 and 39, and the yoke is slid longitudinally relative to the clamping bar assembly 11 until the flaring cone 35 is centered over the tube end. Should the operation be the one wherein the tube end is retained in the recess 42, yoke 12 may nevertheless be properly arranged, as interference therewith by the clamping means 18 is effectively precluded. Handle 34 is then manipulated to advance the flaring cone 35 into the tube end and effect the desired flare. Upon completion of the flare, the flaring cone is withdrawn by reverse manipulation of handle 34, the yoke is dissociated from the clamping bar assembly, and the clamping bars are released by retrograde manipulation of the wing nuts 20 permititng the bars to be swung apart and thereby allow the flared tube end to be withdrawn.

While I have shown and described one embodiment of my invention, it is to be understood that it is capable of many modifications. Changes, therefore, in the construction and arrangement may be made without departing from the spirit and scope of the invention as defined in the appended claims.

I claim:

1. In a tube flaring device including a clamping bar assembly having a pair of elongated bars provided with confronting semicylindrical recesses defining when the bars are juxtaposed a series of axially parallel cylindrical tube clamping recesses, a clamping bolt secured to an end of one bar and having an end extendible through and beyond the adjacent end of the other bar, and a clamping nut threaded to the bolt end, said nut having a generally cylindrical base portion and an outer laterally flaring wing portion adapted to be manipulated to force the base portion against said adjacent end of the bar and forcibly juxtapose the bars, a yoke comprising a crosspiece and a pair of legs extending from the crosspiece and spaced apart at their distal ends a distance substantially equal to the width of the juxtaposed bars to have sliding movement over the bars parallel to the axes of said clamping recesses, and reversely similar recesses in the respective legs, each said recess being spaced from the distal end of the leg and defined by an inner planar surface extending in a plane parallel to the confronting clamping bar outer surface when the yoke is in tube flaring disposition on the clamping bar assembly and at an acute angle to the central plane of the yoke, each recess further having an outer segmentally cylindrical surface extending outwardly from and axially perpendicular to said planar surface to receive a portion of said base portion of the clamping nut when the yoke straddles the juxtaposed bars with said planar surfaces abutting the outer faces of the bars and with the center of said crosspiece of the yoke disposed coaxially of the clamping recess closest to said end of the one bar and adjacent end of the other bar.

2. The tube flaring device yoke of claim 1 wherein said legs have a generally quadrate cross-section in a plane perpendicular to the longitudinal extent thereof, the planar surface extends generally parallel to the plane defined by opposed corner edges of the legs, and the cylindrical surface cuts the outer surface of the leg from substantially the central plane of the yoke.

3. In a tube flaring device including a clamping bar assembly having a pair of elongated bars provided with confronting semicylindrical recesses defining when the bars are juxtaposed a series of axially parallel cylindrical tube clamping recesses, a clamping bolt secured to an end of one bar and having an end extendible through and beyond the adjacent end of the other bar, and a clamping nut threaded to the bolt end to abut said adjacent end of the other bar and forcibly juxtapose the bars, a yoke comprising a crosspiece and a pair of legs extending from the crosspiece and spaced apart at their distal ends a distance substantially equal to the width of the juxtaposed bars to have sliding movement over the bars parallel to the axes of said clamping recesses, and a recess in each leg spaced from the distal end of the leg and defined by an inner planar surface extending in a plane parallel to the confronting clamping bar outer surface when the yoke is in tube flaring disposition on the clamping bar assembly and at an acute angle to the central plane of the yoke, the recess of at least one of the legs further including an outer segmentally cylindrical surface extending outwardly from and axially perpendicular to said planar surface to receive a portion of the clamping nut when the yoke straddles the juxtaposed bars with said planar surfaces abutting the outer faces of the bars.

4. In a tube flaring device including a clamping bar assembly having a pair of elongated bars provided with confronting semicylindrical recesses defining when the bars are juxtaposed a series of axially parallel cylindrical tube clamping recesses, and clamping means including a clamping bolt secured to an end of one bar and having an end extendible through and beyond the adjacent end of the other bar and a clamping nut threaded to the bolt end to abut said adjacent end of the other bar and forcibly juxtapose the bars, a yoke comprising a crosspiece and a pair of legs extending from the crosspiece and spaced apart at their distal ends a distance substantially equal to the width of the juxtaposed bars to have sliding movement over the bars parallel to the axes of said clamping recesses, and a recess in each leg spaced from the distal end of the leg and defined by a planar surface extending in a plane parallel to the confronting clamping bar outer surface when the yoke is in tube flaring disposition on the clamping bar assembly and at an acute angle to the central plane of the yoke, the recess of at least one of the legs further including an outer concave surface opening in the direction of the plane of said planar surface to receive a portion of the clamping means when the yoke straddles the juxtaposed bars with said planar surfaces abutting the outer faces of the bars.

5. A yoke for use in a tube flaring device, comprising: a crosspiece; and a pair of legs extending from the crosspiece and spaced apart at their distal ends, each of said legs having a recess spaced inwardly from the distal end of the leg and defined by an inner planar surface extending in a plane parallel to the longitudinal extent of the leg and at a angle of substantially 45° to the central plane of the yoke, at least one of said recesses further having an outer segmentally cylindrical surface extending outwardly from and axially perpendicular to said planar surface the extent of said surface in the longitudinal direction of the leg being substantially equal to the extent of the planar surface in the longitudinal direction of the leg, each of said legs having a generally quadrate cross section in a plane perpendicular to the longitudinal extent thereof, said planar surface extending generally parallel to the plane defined by opposed corner edges of the legs, and the cylindrical surface cutting the outer surface of the leg from substantially the central plane of the yoke.

References Cited in the file of this patent

UNITED STATES PATENTS

| | | |
|---|---|---|
| 2,132,947 | Gagne | Oct. 11, 1938 |
| 2,278,932 | Kellems | Apr. 7, 1942 |
| 2,314,221 | Kellems | Mar. 16, 1943 |